United States Patent [19]

Fey

[11] 4,013,867
[45] Mar. 22, 1977

[54] POLYPHASE ARC HEATER SYSTEM
[75] Inventor: Maurice G. Fey, Plum Borough, Pa.
[73] Assignee: Westinghouse Electric Corporation, Pittsburgh, Pa.
[22] Filed: Aug. 11, 1975
[21] Appl. No.: 603,579
[52] U.S. Cl. .............................. 219/121 P; 219/383
[51] Int. Cl.² ........................................ H05B 7/18
[58] Field of Search ................ 219/121 P, 383; 315/111.2, 111.4, 137

[56] References Cited
UNITED STATES PATENTS

| | | | |
|---|---|---|---|
| 3,578,943 | 5/1971 | Schoumaker | 219/121 P |
| 3,705,975 | 12/1972 | Wolf et al. | 219/383 |
| 3,770,935 | 11/1973 | Tateno et al. | 219/121 P |

*Primary Examiner*—J. V. Truhe
*Assistant Examiner*—N. D. Herkamp
*Attorney, Agent, or Firm*—L. P. Johns

[57] ABSTRACT

An arc heater system as a high energy heat source characterized by a housing forming a plenum chamber, a plurality of arc heaters mounted on the housing circumferentially and extending substantially radially thereon, each arc heater comprising a downstream electode adjacent to the housing and an upstream electrode remote therefrom and an intermediate gap therebetween, a polyphase wye-connected power system comprising one conductor for each phase and a neutral conductor, the upstream electrodes of each arc heater being connected to the phase conductors, the downstream electrodes being connected to the neutral conductor, whereby arc heated jet streams from the arc heaters merge and project into the housing.

10 Claims, 3 Drawing Figures

POLYPHASE ARC HEATER SYSTEM

CROSS-REFERENCE TO RELATED APPLICATION

This application is related to the copending application of Charles B. Wolf and Maurice G. Fey, Ser. No. 603,611, filed Aug. 11, 1975.

BACKGROUND OF THE INVENTION

1. Field of the Invention:

An arc heater system for operating on line frequency AC power with excellent electrical stability and commercially acceptable performance characteristics as a high energy heat source and operable on a myriad of gases in oxidizing, reducing, or inert conditions.

2. Description of the Prior Art:

As is well known the self-stabilizing arc heater is a single phase device for which the power waveform and the working gas enthalpy level are sinusoidal. The fluctuating enthalpy level is believed to enhance the quenching phenomena in gaseous reactions, such as acetylene production from light hydrocarbons and nitrogen fixation from elemental nitrogen and oxygen, as evidenced by lower measured specific energy requirements compared with other reported constant enthalpy plasma equipment operated on DC power. For example, it has been found that the energy requirements for an AC arc heater plant are as low as 3.7 Kw hr/pound of acetylene produced from methane, whereas an energy requirement of about 4.7 Kw hr/pound of acetylene is reported for a DC arc heater plant.

While the single phase arc heater is beneficial for gaseous reactions, it is detrimental for the heating of solids because when solid particles are injected into the arc heater exit stream during the lower portion of the power wave, they become trapped in a cold gas layer and are therefore not heated to the desired working temperature. An example of where such a phenomena may occur if operating conditions are not properly controlled is a chemical reaction occurring at a high temperature between the arc heated gas and powdered ore injected into the stream for ore reduction as disclosed in U.S. Pat. No. 3,765,870, entitled "Metal Powder Production". Moreover, the single phase device has been objected to because it represents a large unbalanced load in the user's distribution system, which objection may be more or less important depending upon the size and stiffness of individual distribution systems.

SUMMARY

In accordance with this invention it has been found that the foregoing problems may be overcome by providing a polyphase arc heater system as a high energy heat source comprising a housing forming a plenum chamber, a plurality of arc heaters mounted circumferentially on the housing and extending substantially radially thereon, each arc heater comprising a downstream electrode adjacent the housing and an upstream electrode remote therefrom and an intermediate gap therebetween, a polyphase wye-connected power system comprising one conductor for each phase and a neutral conductor, one of the upstream and downstream electrodes of each arc heater being connected to one of the phase conductors respectively, the other of the upstream and downstream electrodes being connected to the neutral conductor, whereby arc heated jet streams from the arc heaters merge and project into the housing.

The advantage of the system of this invention is that it provides a balanced load on the user's distribution system, freedom from power fluctuations and resultant gas energy fluctuations as well as resultant gas velocity and pressure fluctuations, increased capacity over single phase units, improved mixing of particulated solids by injecting axially along the center line of the plenum, and vorticity in the plenum can be attained by locating the arc heaters tangentially on the periphery of the plenum.

DESCRIPTION OF THE PREFERRED EMBODIMENTS

Figure 1:
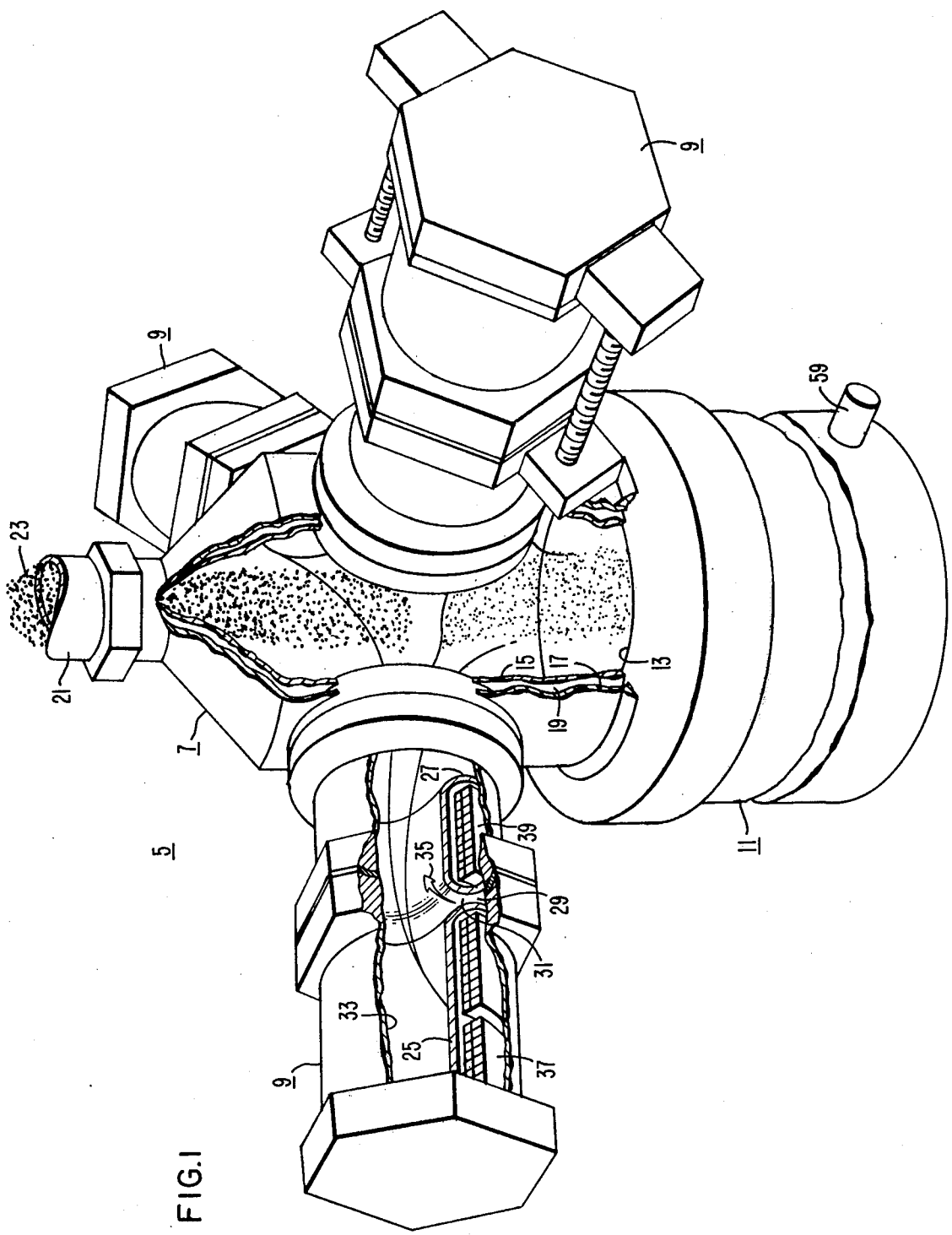
FIG. 1 is a perspective view with portions broken away showing a three-phase type of arc heater system in accordance with this invention.

In FIG. 1 a polyphase arc heater system is generally indicated at 5 and it comprises a housing 7, a plurality (such as three) of arc heaters 9, and a reactor 11.

The housing 7 is preferably a cylindrical member forming a plenum chamber 13 and consisting of double walls 15, 17 forming a water coolant compartment 19 therebetween. The upper end of the housing 7 includes an inlet 21 through which solid particulate material 23 may be introduced into the chamber 13. For example, where the arm heater system is used for the reduction of an ore to the elemental metal, such as $Fe_2O_3$ to iron, the solid particulate material 23 comprises iron ore. The lower end of the housing 7 is open and communicates with the interior of the reactor 11.

Although three arc heaters 9 are disclosed, it is understood that two or more arc heaters may be employed for the purpose of this invention. The arc heaters 9 are similar in construction and operation to that disclosed in U.S. Pat. No. 3,705,975, entitled "Self-Stabilizing Arc Heater Apparatus" of which the inventors are Charles B. Wolf and Maurice G. Fey. Because of the full disclosure in that patent, the description of the arc heaters 9 is limited herein to the basic structure and operation. Each of the arc heaters 9 is a single phase, self-stabilizing AC device capable of power levels of up to about 3500 kilowatts or up to 10,000 kilowatts for a three-phase plant installation. For the practice of this invention, it is preferred that three arc heaters be provided, one for each of the three phases of the AC power supply. Each arc heater 9 comprises two annular copper electrodes 25, 27 having a space or gap of about 1 millimeter to accommodate the line frequency power source of about 4 kV. A spark occurs in the gap 29 and incoming feed stock gas 31 immediately blows the spark from the gap into the interior of an arc chamber 33 formed by the aligned electrodes 25, 27 as indicated by the arrow 35. The extended arc 31 rotates at a speed of about 1,000 revolutions per second by interaction of the arc current (several thousand amps AC) with a DC magnetic field set up by internally mounted field coils 37, 39. Such velocities result in a very high operating efficiency for equipment of this type. Exit enthalpies ranging, for example, up to about 15,000 BTU per pound when operated on methane are easily obtained at good thermal efficiency at the exit end of the arc heater chamber 33. More specifically, as the gas 31 enters the arc chamber it moves downstream toward the plenum chamber 13. Thus, the electrodes 25 and 27 are upstream and downstream electrodes respectively.

As shown more particularly in FIG. 2, and for reasons set forth below, the arc 31 extends into the plenum chamber 13 and merges with corresponding arcs 31 of the other arc heaters 9, whereby the downstream extremity of each arc 31 eventually skips the downstream electrode 27 to complete the circuit through one of the other arcs 31. Thus, a unique three-phase arc heater system is disclosed in which three wye-connected self-stabilizing arc heaters fire into a common plenum where the arcs impinge on one another to form a three-phase arc that is drawn between the three upstream electrodes 25.

Figure 2:
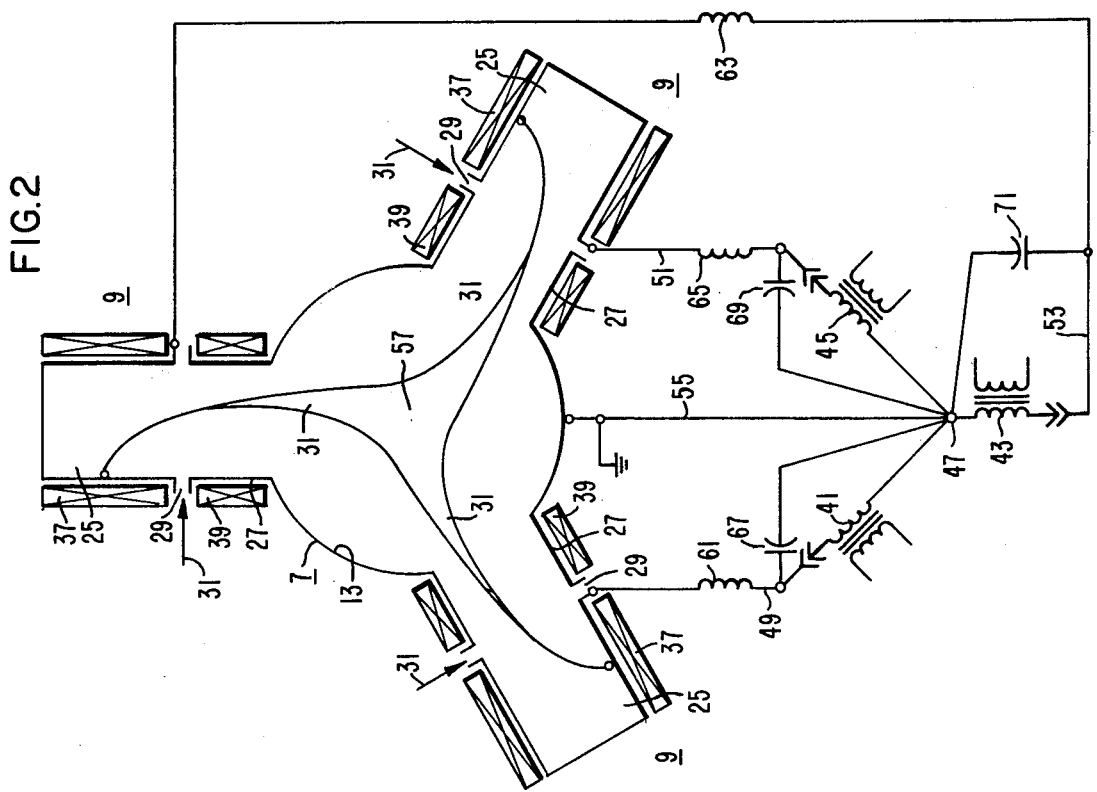
FIG. 2 is a schematic horizontal sectional view and showing a power source.

The electric circuit by which the three-fold arcing phenomenon functions is shown in FIG. 2 in which a wye-connected power system includes the beginning of each winding 41, 43, 45 are connected together at 47 and the other ends are connected by phase conductors 49, 51, 53, respectively, to the upstream electrodes 25 of each arc heater 9. A ground neutral conductor 55 extends from the connection 47 to the housing which in turn is connected to the downstream electrodes 27 of each arc heater 9. In a conventional manner each winding 41, 43, 45 is a secondary winding of an output transformer having primary windings from an AC source.

Accordingly, for one phase of the AC cycle the current flows through the coil 41, the conductor 49, the current limiting reactor 61, the upstream electrode 25, the arc 31, through the upstream electrode 25 of the adjacent arc heater 9 to the conductor 53, the current limiting reactor 63 and the coils 43. The next phase of the cycle includes a combination of another pair of the arc heater 9 so that the arc 31 flashes intermittently between two of the three upstream electrodes 25 and passing through the arc chamber 13 substantially as shown in FIG. 2. Capacitors 67, 69 and 71 serve the purpose of power factor correction.

In operation, as solid particulate material 23 enters the plenum chamber 13, it falls through the mergerer or confluence 57 of the several arcs 31 wherein the proper gas atmosphere, either oxidizing, reducing, or inert, the material 23 changes form either chemically or physically and continues to drop the plenum chamber 13 into the reactor 5 where it is collected and ultimately removed through an outlet 59.

Manifestly, the three-phase arc heater system 5 as shown in FIGS. 1 and 2 provides high energy heat source to support a particular reaction as may be desired. The reaction is dependent upon the type of solid particulate material 23 introduced as well as the particular gas necessary for the reaction as introduced through the gap 29 of each arc heater 9. For example, the arc heater system 5 may be used to reduce iron ore ($Fe_2O_3$) by the injection of a reducing gas, such as methane ($CH_4$), into the arc heaters, whereby elemental iron is collected at the bottom of the reactor 5.

Another example by which the arc heater system 5 may be employed is to introduce magnetite ($Fe_3O_4$) as the solid particulate material 23 with an inert gas introduced through the gaps 29. In this case the arc heater melts the magnetic particles within the plenum chamber 13 which molten droplets form spheres as they fall through the reactor 5 to be solidified and collected at the bottom of the reactor.

Figure 3:
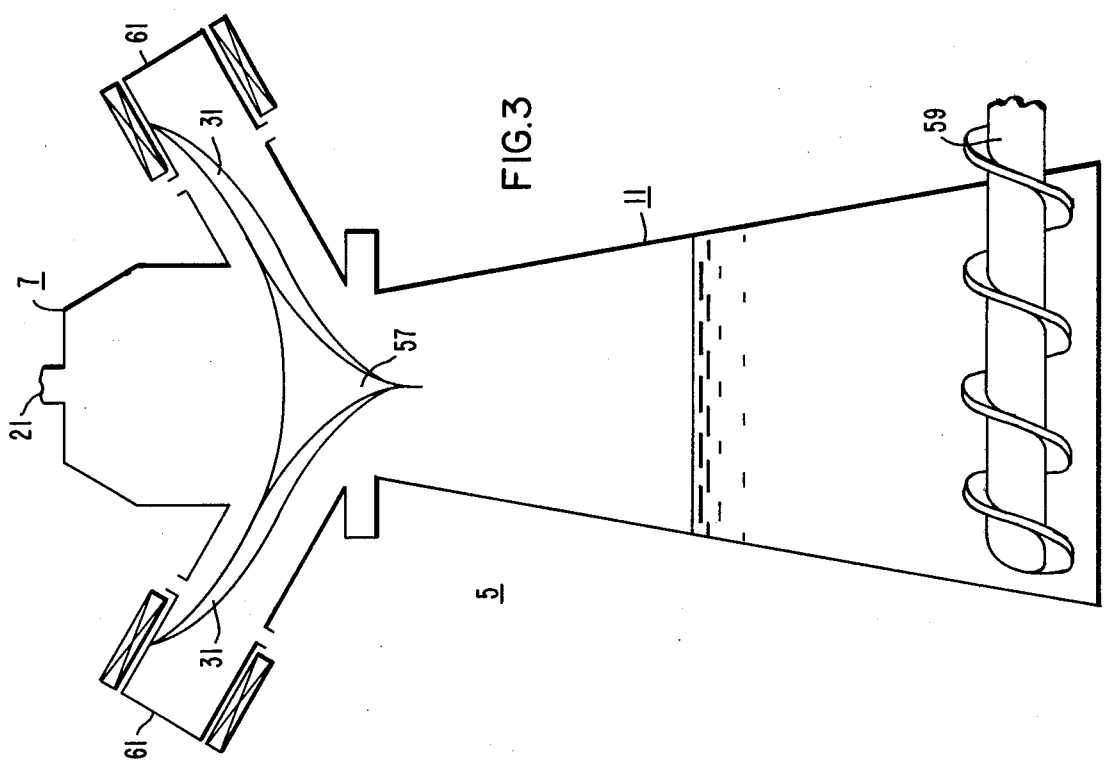
FIG. 3 is a vertical sectional view showing another embodiment of a three-phase arc heater system.

Another embodiment of the arc heater system 5 is that shown in FIG. 3 in which similar numerals refer to similar parts to facilitate the description. More particularly, the embodiment of FIG. 3 differs from that of FIG. 2 in that several arc heaters 61 which extend substantially radially in a manner similar to the arc heaters 9 in FIG. 1. However, the arc heaters 61 are inclined upwardly from the housing 7, such as at an angle of 30° to the vertical axis of the upright arc heater system 5. The advantage of providing the arc heaters 61 at an angle is that the central confluence or jet stream 57 of the several arcs 31 extends downwardly and farther into the reactor 11, thereby exposing the material 23 to the confluence of the arc jet for a longer time.

Finally, although a three-phase arc heater system is disclosed and preferred, it is noted that any other number of phases and arc heaters 9 may be employed.

In conclusion, the advantages of the multiphase arc heater system of this invention include arcing on only three electrodes thereby reducing the electrode replacing time and expense, providing higher heat transfer rates to the material being processed, and passing the material through an impingement or merging zone of the several arcs provided by the polyphase arc heating system.

What is claimed is:

1. An arc heater system as a high energy heat source comprising a housing forming a plenum chamber, a plurality of arc heaters mounted on the housing and extending substantially radially thereon, each arc heater comprising a downstream electrode adjacent the housing and an upstream electrode remote therefrom and an intermediate gap therebetween, a polyphase wye-connected power system comprising one conductor for each phase and a neutral conductor, the upstream electrodes of each arc heater being connected to one of the phase conductors respectively, the downstream electrodes being connected to the neutral conductor, whereby arc heated jet streams from the arc heaters merge and project into the housing.

2. The arc heater system of claim 1 in which there are three phases.

3. The arc heater system of claim 2 in which housing is connected to the neutral conductor.

4. The arc heater system of claim 1 in which a three phase arc is conducted through a confluence of the three individual arc heated streams.

5. The arc heater system of claim 1 in which the axis of each arc heater is included at an acute angle to the axis of the housing.

6. The arc heater system of claim 5 in which the housing axis is vertical.

7. An arc heater system as a high energy heat source comprising a housing forming a plenum chamber, a plurality of arc heaters mounted on the housing and extending substantially radially thereon, each arc heater comprising an upstream electrode and a downstream electrode and a gap therebetween, a polyphase wye-connected power system comprising one conductor for each phase and a neutral conductor, each upstream electrode being connected to one of the phase conductors, and all of the downstream electrodes being connected to the neutral conductor, whereby arc heated jet streams from the arc heaters merge and project into the housing.

8. The arc heater system of claim 7 in which the housing is connected to the neutral conductor.

9. An arc heater system as a high energy source comprising a metal housing forming a plenum chamber, three arc heaters mounted on the housing and extending substantially radially thereon, each arc heater comprising an upstream annular electrode, a downstream annular electrode, and an annular gap therebetween, a three-phase wye-connected power system comprising one conductor for each phase and a grounded neutral conductor, each upstream annular electrode being connected to one of the phase conductors, all of the downstream electrodes and the housing being connected to the grounded neutral conductor, and the housing having a downstream portion, whereby arc heated jet streams from the arc heaters merge and project into the housing downstream portion.

10. The arc heater system of claim 9 in which the axes of the arc heaters are inclined to the axis of the housing.

* * * * *